United States Patent [19]
Rau et al.

[11] 3,930,688
[45] Jan. 6, 1976

[54] ANTI-SKID CONTROL SYSTEM

[75] Inventors: James E. Rau; Rogell Van Wyk, both of Anaheim; George A. Watson, Tustin, all of Calif.

[73] Assignee: Rockwell International Corporation, El Segundo, Calif.

[22] Filed: Oct. 15, 1974

[21] Appl. No.: 514,974

Related U.S. Application Data

[63] Continuation of Ser. No. 354,295, April 25, 1973, abandoned.

[52] U.S. Cl. ............ 303/21 P; 235/150.2; 303/20; 303/21 A; 303/21 AF
[51] Int. Cl.² .......................................... B60T 8/08
[58] Field of Search ............... 188/181; 235/150.2; 303/20, 21; 307/10 R; 317/5; 324/161–162; 340/53, 62

[56] References Cited
UNITED STATES PATENTS

| | | | |
|---|---|---|---|
| 3,235,036 | 2/1966 | Meyer et al. | 303/21 P |
| 3,508,795 | 4/1970 | Scharlack et al. | 303/21 P |

Primary Examiner—Trygve M. Blix
Assistant Examiner—Stephen G. Kunin
Attorney, Agent, or Firm—H. Fredrick Hamann; Rolf M. Pitts

[57] ABSTRACT

An anti-skid control system for decreasing braking distance performance of a braked wheeled vehicle while maintaining the lateral stability thereof. The system is comprised of a digital data logic processor responsive to only wheel deceleration and wheel velocity of the braked vehicle for iteratively or alternatively preselectively attenuating and restoring an applied brake fluid pressure, so as to cause the brake system performance to track the knee of the road-torque versus wheel velocity envelope as a function of time. The only parameters employed are wheel deceleration, wheel velocity and mode time for mode-switching between the several control modes (selective brake pressure attenuation and restoration) employed, while the modes themselves include preselective time-scheduling of the respective brake pressure attenuation and restoration.

12 Claims, 15 Drawing Figures

EQUATION (6)

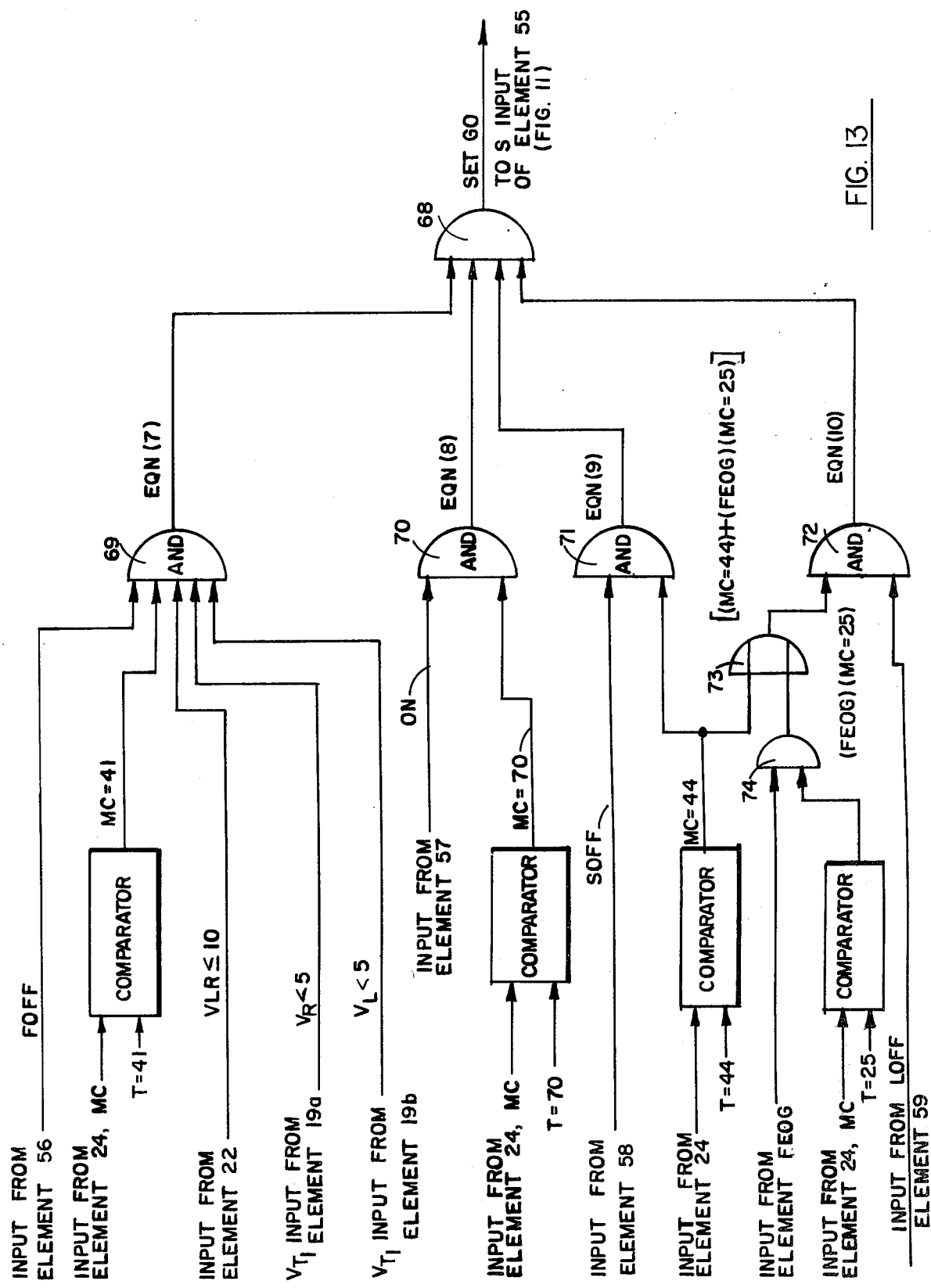

ANTI-SKID CONTROL SYSTEM

This is a continuation of application Ser. No. 354,295 filed Apr. 25, 1973, now abandoned.

RELATED COPENDING APPLICATIONS

1. U.S. application Ser. No. 317,993 filed Dec. 26, 1972 for "Digital Acceleration Measurement Device" by J. E. Rau et al., now U.S. Pat. No. 3,805,089.

2. U.S. application Ser. No. 333,572 filed Feb. 20, 1973 for "Phase Sensitive Position Pickoff Device" by D. E. McKee et al., now U.S. Pat. No. 3,863,235.

3. U.S. application Ser. No. 268,070 filed June 20, 1972 for "Brake Control" by L. C. Dozier, now U.S. Pat. No. 3,790,227.

BACKGROUND OF THE INVENTION

As is well understood, increased automotive traffic density, traffic speeds, and use of large, heavy payload automotive vehicles have all aggravated the problem of traffic safety relative to operator performance margins in effecting safe vehicle braking within minimum braking distances and while maintaining vehicle lateral stability. In other words, the operator's actuation and control of the braking system needs to be automatically augmented so as to assure the prevention or reduction of loss of lateral stability, (tendency to jackknife) and skidding (wheel-lock or excessive slipping) and increased stopping distances due to operator skill limitations (resulting in over-control).

As indicated in copending U.S. application Ser. No. 268,070 (now U.S. Pat. No. 3,790,227) owned by Rockwell International Corporation, assignee of the subject invention, there have been a number of prior art systems directed to providing anti-skid brake control by means interposed between the operator control and the brake valves of a fluid pressure operated braking system for variously releasing or otherwise attenuating and re-applying the operator-applied brake pressure.

Such techniques have included various means responsive to combinations of braked wheel acceleration/deceleration and wheel speeds. One approach has compared the slipping wheel velocity with vehicle velocity (non-slipping or synchronous wheel velocity). Such approach may employ a free-wheeling or unbraked wheel to determine such vehicle-velocity or synchronous velocity. Alternatively, zero wheel acceleration under the condition of at least a preselected range of wheel velocity conditions may be employed as indicative of synchronous (non-slip) wheel speed. Still further refinements have employed complex logic with comparisons between the braked wheels at opposite ends of an axle to determine whether a velocity difference exists between such wheels and further, which of such wheels will be employed during such comparison period as a source of braking performance (wheel speed and acceleration) data for system operation.

None of such prior-art approaches have, however, resulted in a system generally useful over a wide range of braking conditions, but instead have demonstrated only limited performance under the restricted range of conditions for which they were adapted, while yet requiring undue complexity. For example, the system disclosed in the above-noted U.S. Pat. No. 3,790,227 monitors the existence of wheel speed differences among a wheel set and determines which wheel performance is to be employed for anti-skid control purposes, thereby adding to the control logic complexity. Also, the system of such copending application controls a restoration of a released brake pressure in response to (after the fact of) a positive wheel acceleration, as to result in a delayed control mode with associated over-control. Such system also employs the determination and storing of a maximum deceleration for control system use, whereby special peak-detecting and memory functions are required, and also employs synchronous wheel speed as a control system criterion. Also, the performance of the above-noted delayed control mode with associated over-control performance is further aggravated by the use of a limited number of pre-selected discrete values of pressure attenuation (ratios of commanded pressure to available pressure), resulting over-use of pressure dump (zero pressure) and consequent over-control.

In summary, then, the prior art of anti-skid control systems has suffered from over-complexity or limited performance or both.

SUMMARY OF THE INVENTION

By means of the concept of the subject invention, the abovenoted shortcomings and disadvantages of the prior art are overcome and there is provided proportional control means responsive to only a limited number of parameters (design simplification) for increased control effectiveness (improved performance) over a wider range of braking conditions. Such design simplification and improved performance are achieved by a digital machine control method employing a set of iterative control steps of 1. preselectively relieving an applied brake pressure to a braked wheel in response to either wheel deceleration thereof being greater than a preselectively large first level or the combination of a wheel deceleration of a lesser preselected second level and a wheel velocity within a preselected first range of upper and lower velocity levels; and 2. preselectively restoring, at least partially, an applied wheel brake pressure to said braked wheel for a period not in excess of a preselected first mode interval in response to said wheel deceleration being less than said second lesser deceleration level and said wheel velocity being at least equal to a second velocity level less than said first range of upper and lower velocity levels.

Such combination of deceleration and velocity limits and mode interval are selected from considerations of the braked vehicle characteristic or performance envelope of road torque and velocity versus time so as to cause the braking control to track or follow the knee of such performance envelope. Thus, in normal operation of the disclosed machine method, braking control of a braked vehicle is augmented by proportional control for selective modulation of the fluid pressure applied to the valve of at least one braked wheel so as to cause the braked wheel to optimally respond to changes in applied braking pressures without suffering wheel lock-up or excessive slip over a wide range of road conditions for which the method of the invention is operable.

Mode release or pressure program adaptation steps may also be included for recycling the iterative steps upon system tracking performance seriously deviating from or overshooting the knee of the envelope.

Accordingly, an object of the subject invention there is to provide an improved anti-skid brake control system avoiding many of the unnecessary refinements of the prior art.

Another object of the invention is to provide a proportional control type anti-skid brake control system demonstrating improved performance through reduced wheel lock and wheel slip together with reduced vehicle stopping distances.

A further object of the invention is to provide an anti-skid brake control system having improved performance and reliability which is relatively inexpensive to manufacture.

These and further objects of the invention will become apparent from the following description, taken together with the accompanying drawings in which:

BRIEF DESCRIPTION OF THE DRAWINGS

FIG. 13 is an exemplary embodiment of the logic state set input to element 55 of FIG. 11;

In the figures, like reference characters refer to like parts.

DESCRIPTION OF THE PREFERRED EMBODIMENT

Figure 1:
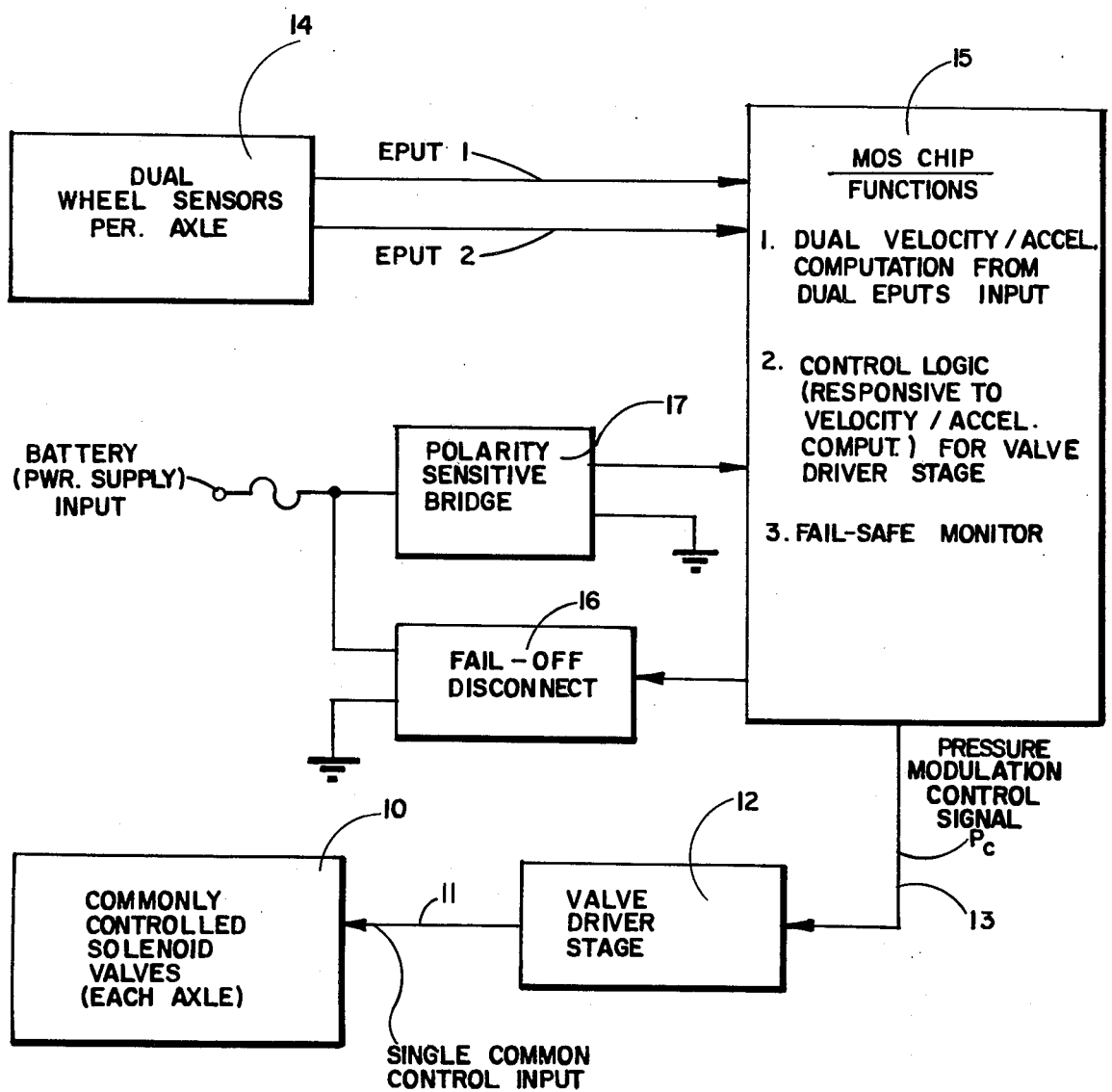
FIG. 1 is an illustration in block diagram form of a system in which the concept of the invention may be advantageously employed.

Referring now to FIG. 1, there is illustrated in block diagram form an anti-skid brake control system in which the concept of the invention may be advantageously employed. There are provided commonly controlled solenoid valves 10 interposed in fluid circuit with the fluid-pressure operated brakes for the wheels at both ends of an axle set of braked wheels (not shown). Such valves do not constitute an aspect of the present invention and are therefore shown as a single functional block 10 only for convenience in exposition, being disclosed more fully by at least FIG. 1 of the above-noted U.S. Pat. No. 3,790,227. The single common electrical input 11 to block 10 is driven by a valve driver stage 12 in response to brake pressure modulation control signals $P_c$ applied to an input of stage 12. The function of stage 12 is to apply a fixed periodic or pulse train input to line 11, the duty cycle or pulse width of which is varied in response to the analog amplitude of the envelope of $P_c$, the pulse train periodicity being selected to be faster than the fluid pressure-controlled brake response, while within the speed of response limit of the solenoid valves 10. Thus, the actual pressure control provided by valves 10 is an average of the scheduled pressure values, averaged over the period of the fluid control system response time. Such control technique is well understood in the art, as is described for example in U.S. Pat. No. 3,637,264 to Leiber. Accordingly, element 12 is shown in FIG. 1 in block form only.

The function of the cooperation of block elements 10 and 12 is to modulate or selectively attenuate the fluid brake pressure applied to a fluid-controlled brake system (not shown) in response to selected rolling states of the braked wheels, as determined from a dual set of wheel sensors 14 and comprising a sensor for that brake wheel at each end of an axle and controlled by one of valves 10. Each sensor of dual set 14 provides an output comprising a series of electrical pulses or events per unit time (EPUT's) which are processed to determine the velocity and rate of change of velocity of an associated wheel. The construction and arrangement of a preferred embodiment of such sensors is disclosed in copending U.S. application Ser. No. 333,572 filed Feb. 20, 1973 (now U.S. Pat. No. 3,863,235) for "Phase Sensitive Position Pickoff Device" by D. E. McKee, et al., and owned by Rockwell International Corporation, assignee of the subject invention. Accordingly such wheel sensor set 14 has been shown in block form only.

Figure 4:
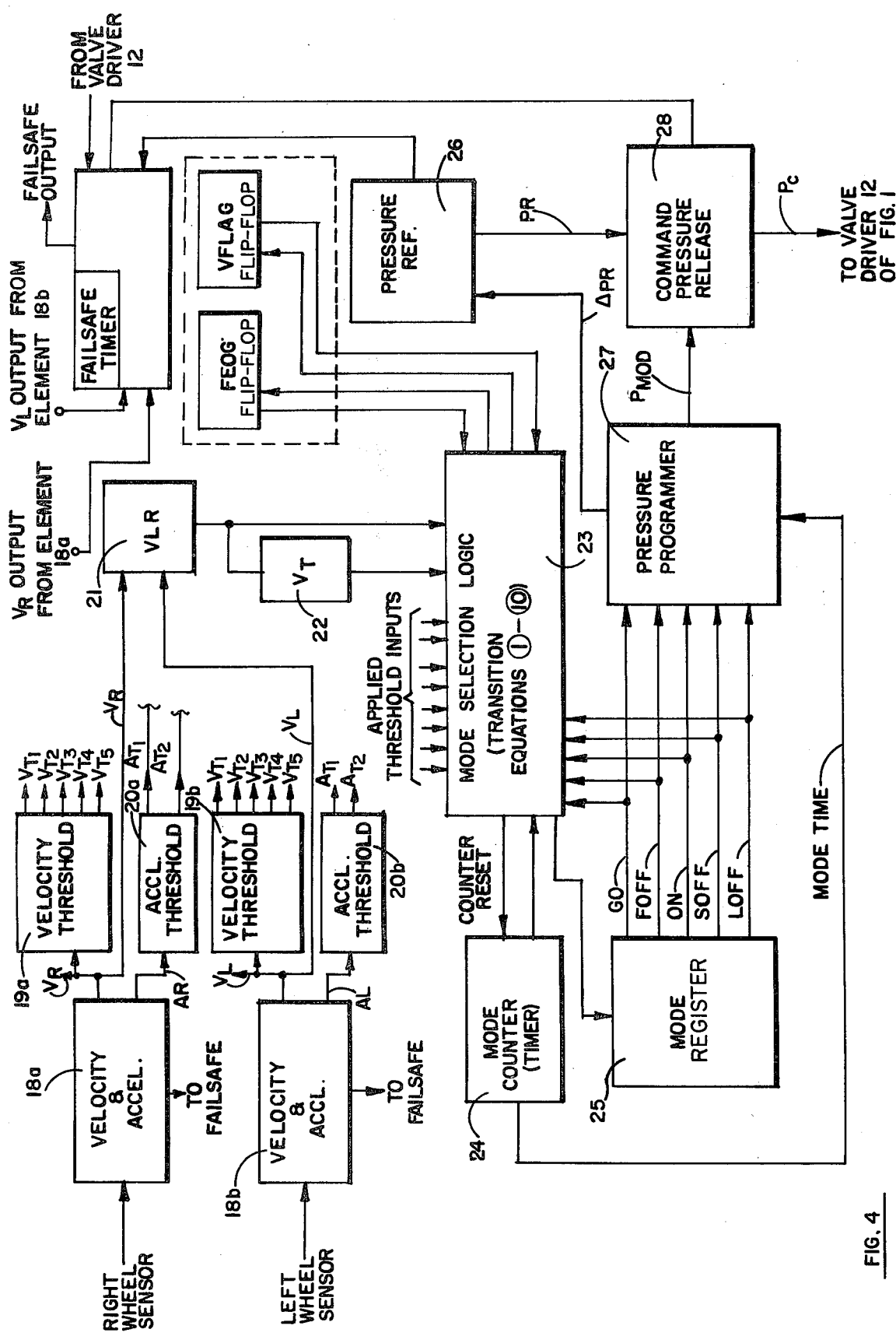
FIG. 4 is a functional block diagram in further detail of a portion of the logic chip in the arrangement of FIG. 1, and showing the general functional arrangement of the inventive concept.

There is further provided in the arrangement of FIG. 1 a special purpose microcircuit chip 15 (say, a metal oxide semiconductor device) for performing the several functions of: calculating the wheel velocity (in fps) and wheel acceleration (in g's) from the EPUT input applied thereto by block element 14; implementing a desired computing and control logic arrangement for control of the signal $P_c$ (applied to valve driver stage 12); and effecting system fail-safe monitoring, as shown more particularly in FIG. 4.

Refering now to FIG. 4, there is illustrated in block diagram form a preferred functional arrangement of a portion of chip 15 in further detail. There are provided first and second velocity and acceleration computing means 18a and 18b responsive to the respective EPUT outputs of element 14 of FIG. 1. The first function, that of braked wheel velocity and acceleration computation (with a preferred degree of digital resolution) has been described in copending U.S. application Ser. No. 317,993 filed Dec. 26, 1972 (now U.S. Pat. No. 3,805,089) for "Digital Acceleration Measurement Device" by J. E. Rau, et al., and owned by Rockwell International Corporation, assignee of the subject application. Accordingly, such computation means have been shown in block form only in FIG. 4.

Such respective left and right wheel velocity and acceleration data are then further processed (by elements 19a, 19b, 20a, 20b, 21 and 22 of FIG. 1) to provide several two-state signals indicative of selectively thresholded velocity and acceleration parameters utilized in the logic control process.

Each of elements 19a and 19b, for example, include two state responsive, thresholded signalling elements for providing two state signals ($V_{T_n} - \bar{V}_{T_n}$) indicative of a braked wheel velocity state in excess of certain preselected velocity levels, $V_{T_1} \geq 5$ fps
$V_{T_2} \geq 6$ fps
$V_{T_3} \geq 8.5$ fps
$V_{T_4} \geq 15$ fps
$V_{T_5} \geq 35$ fps each of which velocity states, either alone or in conjunction with a preselected acceleration state and/or mode time interval, correspond to a braking system performance point of control interest and which it utilized to alter the control mode or system performance, as will be more fully explained hereinafter.

Element 21 is responsive to both left and right wheel velocities ($V_L$ and $V_R$) to provide a scaled velocity signal VLR, corresponding to one-half the average of the two wheel velocities, or one fourth of the sum thereof $$\left( \frac{V_L + V_R}{4} \right);$$

while element 22 is responsive to the output VLR of element 21 to provide a thresholded velocity signal $V_T$ having a guaranteed minimum value:

$V_T = VLR - 5$ fps, if VLR $> 10$ fps
or $V_T = 5$ fps, if VLR $\leq 10$ fps.

Figure 9:
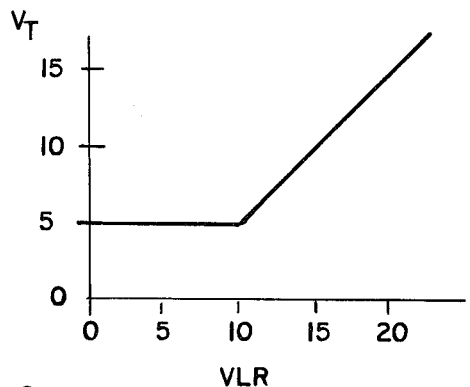
FIG. 9 is an illustration of the response of element 22 as a function of the applied input thereto.
Figure 10:
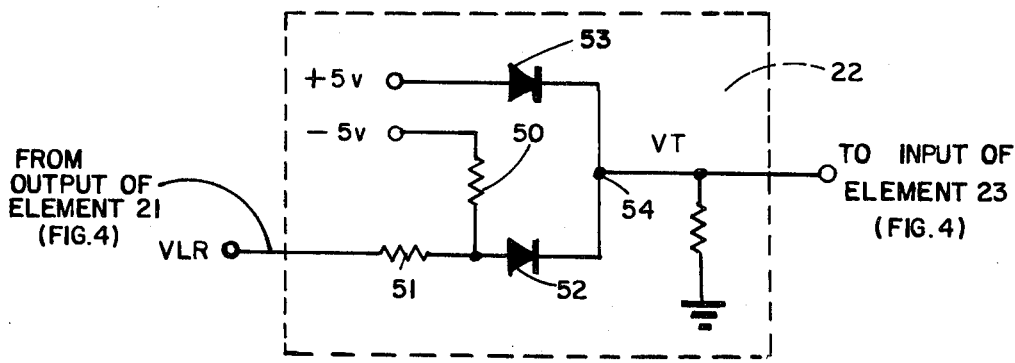
FIG. 10 is an analog equivalent of an exemplary functional embodiment of element 22.

Each of elements 20a and 20b include two-state responsive, thresholded as shown graphically by FIG. 9, while an exemplary analog equivalent, employing biasing voltages corresponding to +5 mph and −5 mph and also employing two mutually back biasing diodes, as an OR gate (for teaching purposes only) is shown in FIG. 10 signalling elements for providing two-state signals ($A_{T_n}$, $\bar{A}_{T_n}$) indicative of a braked wheel deceleration state in excess of certain preselected deceleration levels, $A_{T_1} = -2$ g's
$A_{T_2} = -3.2$ g's
$A_{T_3} = -4$ g's The construction and arrangement of means for combining thresholding, and two-state processing of signals is well understood in the art; therefore, elements 19a, 19b, 20a, 20b, 21 and 22 are shown in block form only in FIG. 4.

Although the above-noted parameters are determined from individual left and right wheel signals and combinations thereof for use in generating a single control signal $P_c$ for common control of both wheels of an axle, the system to be further described is not so limited, and may be implemented in the alternative by the use of data from only a single wheel for singular control of such single wheel. In other words, a single wheel system (one for each wheel) is contemplated as an alternative to a dual wheel system in which the set of left and right wheels of an axle are commonly controlled. Because of the low-cost in mass production of the monolithic MOS chip to be employed, such single wheel system is most conveniently effected by merely tying the two (left and right wheel) sensor inputs of 18a and 18b together.

The above-noted thresholded velocity and acceleration signals are employed by mode selection logic means 23, in cooperation with a mode counter or clock 24 and mode register 25 for the construction of a pressure control signal $P_c(t)$ representing a commanded control pressure program designed to provide optimum braking system performance. Such pressure control signal serves, through valve driver 12 of FIG. 1, to selectively attenuate an operator-applied brake fluid pressure to cause the braked wheel performance to track the knee of the road torque versus wheel velocity envelope as a function of time, which knee is shown in FIGS. 2, 3 and 7.

Figure 2:
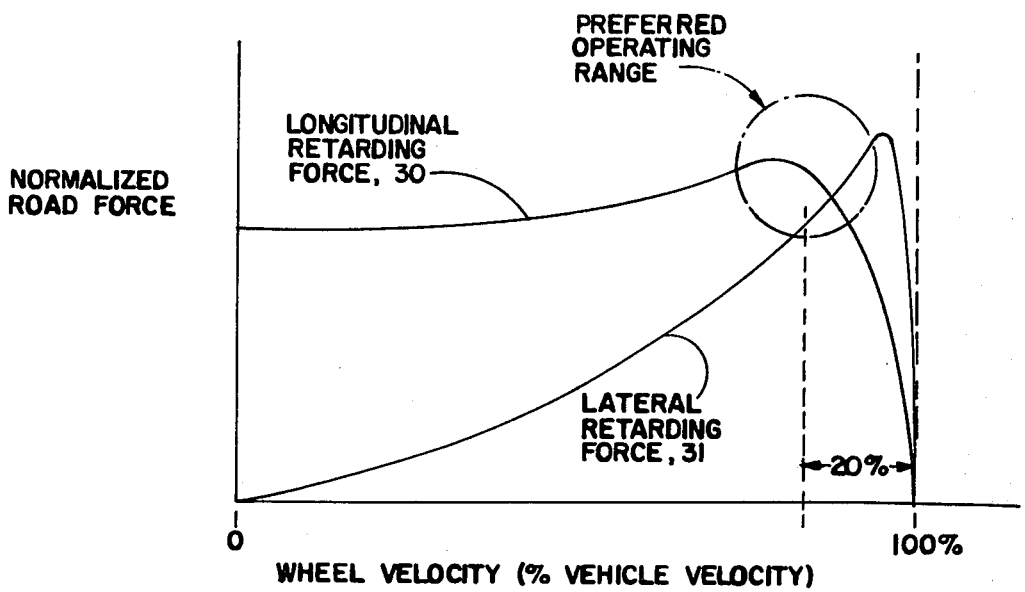
FIG. 2 is a representative performance diagram of normalized road force versus normalized wheel velocity (normalized as a percentage of vehicle velocity) showing the respective points of inflection in the curves of longitudinal and lateral retarding forces imposed on the vehicle as the wheel velocity slows or slips (under applied braking control) from synchronous, or vehicle, velocity.
Figure 3:
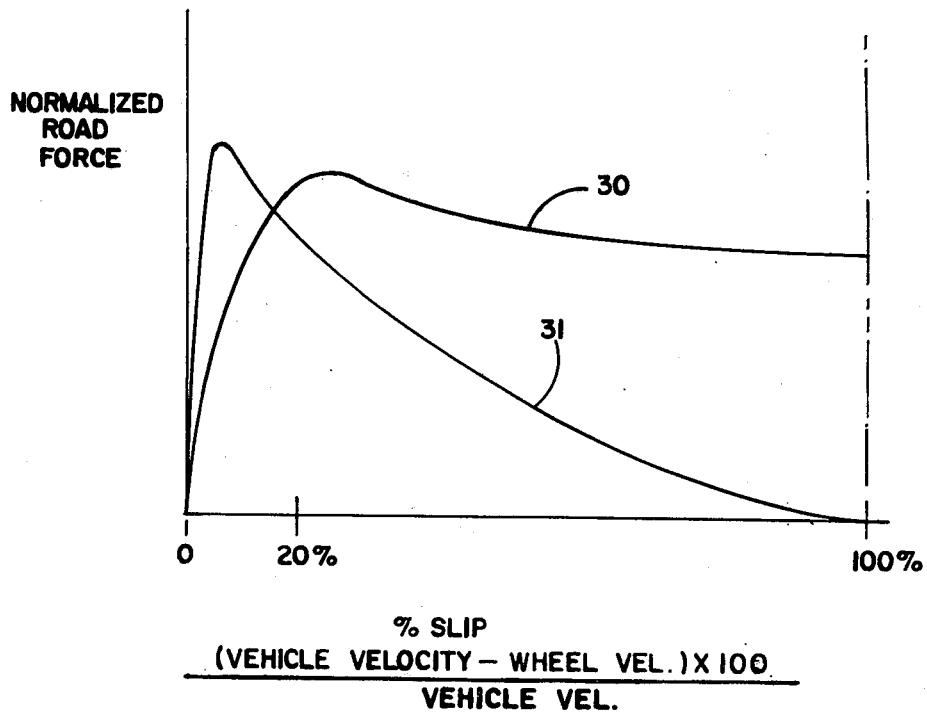
FIG. 3 is an alternate representation of the representative forces depicted in FIG. 2 as functions of wheel slip.

Referring to the representative normalized response curves of FIGS. 2 and 3, it is clear that as the braked wheel velocity slips relative to the vehicle velocity (or non-slipping wheel velocity or synchronous wheel velocity), the road force exerted on the vehicle builds up from zero, usually to a "knee" or point of inflection, after which such road force tends to decrease (the vehicle tends to slip or slide). The occurrence of the lateral retarding force knee at relative low values of slip and the rapid attenuation of such force for wheel velocity slip values in excess of that associated with the knee of the longitudinal retarding force curve, as to demonstrate the extreme lack of lateral stability (resulting in lateral slipping and sliding) at such high values of wheel slip. Where, however, the braking performance of the braked wheel can be held within the preferred region of the knee of the longitudinal retarding force curve, then such maximum longitudinal road force results in minimum stopping distance performance while avoiding the performed region of low lateral stability. Such preferred region corresponds generally to about 20 percent slip. Thus, a preferred braking mode of operation would result in a constant wheel slip of about 20 percent as the vehicle is slowed to a stop, as shown by the optimum wheel velocity line in the exemplary diagram of velocity versus time shown in FIG. 6, which braked wheel optimum velocity line lies below the braked vehicle velocity line by an amount corresponding to such slip value.

Figure 6:
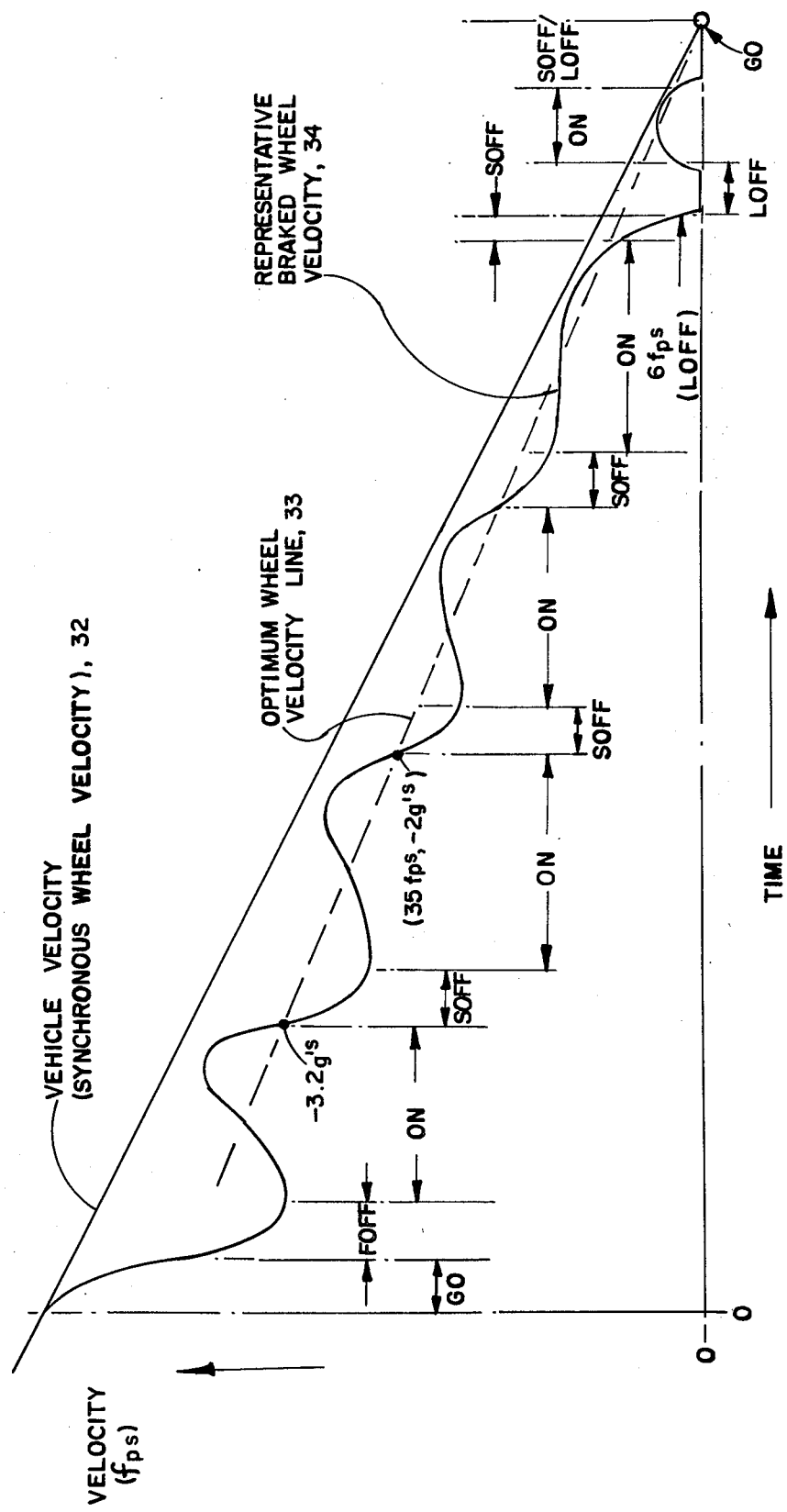
FIG. 6 is a representative velocity time history of the system of FIG. 1 and illustrating certain characteristics of the system response.

Now, by means of the control logic chip of FIG. 4, the actual braked wheel velocity is made to track or vary about such optimum line, as illustrated by the representative braked wheel velocity curve shown in FIG. 6. Such representative braked wheel velocity performance is seen to avoid deep "dives" or large velocity dips or excursions, as to avoid excessive slip or wheel lock at high vehicle velocities.

Figure 7:
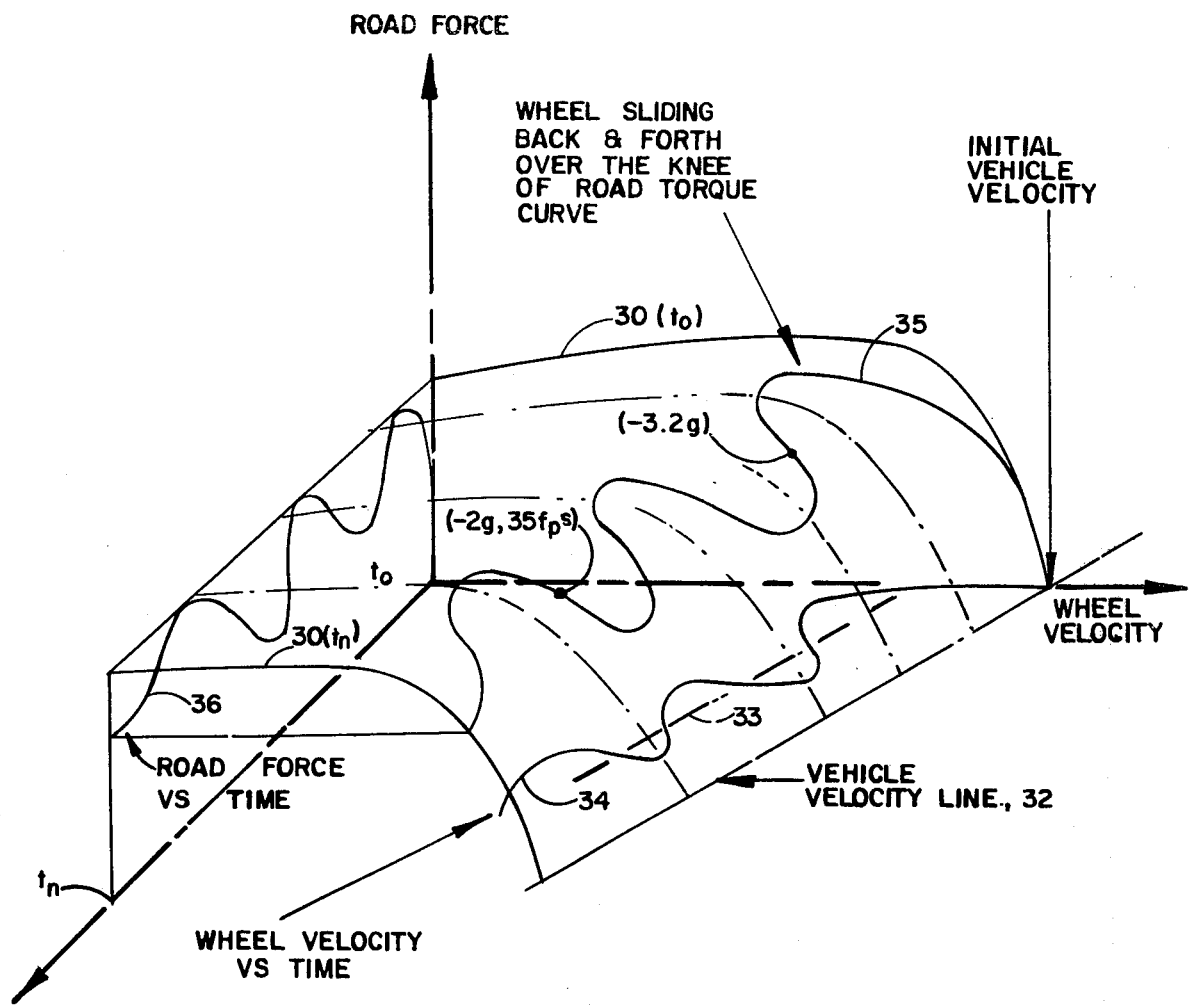
FIG. 7 is an illustration of a representative three dimensional envelope of the longitudinal road torque versus wheel velocity response as a function of time, depicting the knee of such envelope as a preferred system operating region.

A representative performance model of a braked vehicle due to the combined properties of road force and braked wheel velocity characteristics are shown by the representative performance envelope depicted in FIG. 7, curves 30, 31, 32, 33 and 34 corresponding to the like referenced curves of FIGS. 2 and 6. Curve 35 represents the system performance of sliding about (e.g., tracking) the knee of the road force versus velocity envelope as a function of time, which performance is projected onto the velocity versus time plane as curve 34 and onto the road force versus time plane as curve 36. Such performance characteristic is achieved by means of the cooperation of mode selection logic element 23 (in FIG. 4), utilizing certain parametric data sets of braked wheel velocity and deceleration (rate of change of velocity) and control mode time interval, as deduced from such performance envelope.

The several control modes employed are set-up or held in a mode register 25 and are selected by logic 23 as functions of preselected velocity and deceleration data (from elements 19a, 19b, 20a, 20b, 21 and 22) and mode time (provided by a mode time counter or clock 24 which is reset to zero time upon a change or switch in modes by logic 23). Each such mode generates a programmed pressure or braked pressure change as a function of the mode time. Such pressure program $P_c(t)$ for each mode is generated by the combination of a pressure reference ((PR) in memory element 26) which is responsive to a $\Delta PR$ selected for such mode by logic 23 through mode register 25, and a modulation $P_{(mod)}$ applied thereto by pressure programmer 27 as a function of mode (identified by mode register 25) and mode time (provided by mode timer 24), such combination of PR and $P_{(mod)}$ being achieved by signal combining means 28 to provide the $P_c(t)$ output.

Mode counter 24 employs a clock interval of 20 milliseconds, intended to be greater than the clock intervals employed by the velocity and acceleration detection means 18a and 18b while yet being less than the response time of the brake valves. In this way, adequate digital resolution is provided for the data employed by the control logic, while the system performance is limited by only the valve performance limits. The brake control valve response may be described as a pure (dead time) delay followed by a first order leg or exponential rise time. Such delay may be on the order of 50 milliseconds and the rise time about 90 milliseconds, for a total representative response time on the order of 140 milliseconds. Thus, for a mode counter clocking interval of 20 milliseconds, such 140 millisecond response time corresponds to seven clock intervals or mode counts (7MC).

The several logic control modes employed by the system of FIG. 4 are identified as GO, FOFF, ON, SOFF and LOFF and are further identified as follows, in conjunction with the logic flow diagram of FIG. 5.

Mode GO identifies a non-control or non-interruption or nonmodulation mode, corresponding to a full-pressure on state: where the system of the invention does not modulate either the amplitude or time duration of an operator-applied brake fluid pressure. Such mode is the initial mode from which the game of modes departs or starts and to which it returns or ends.

Figure 8:
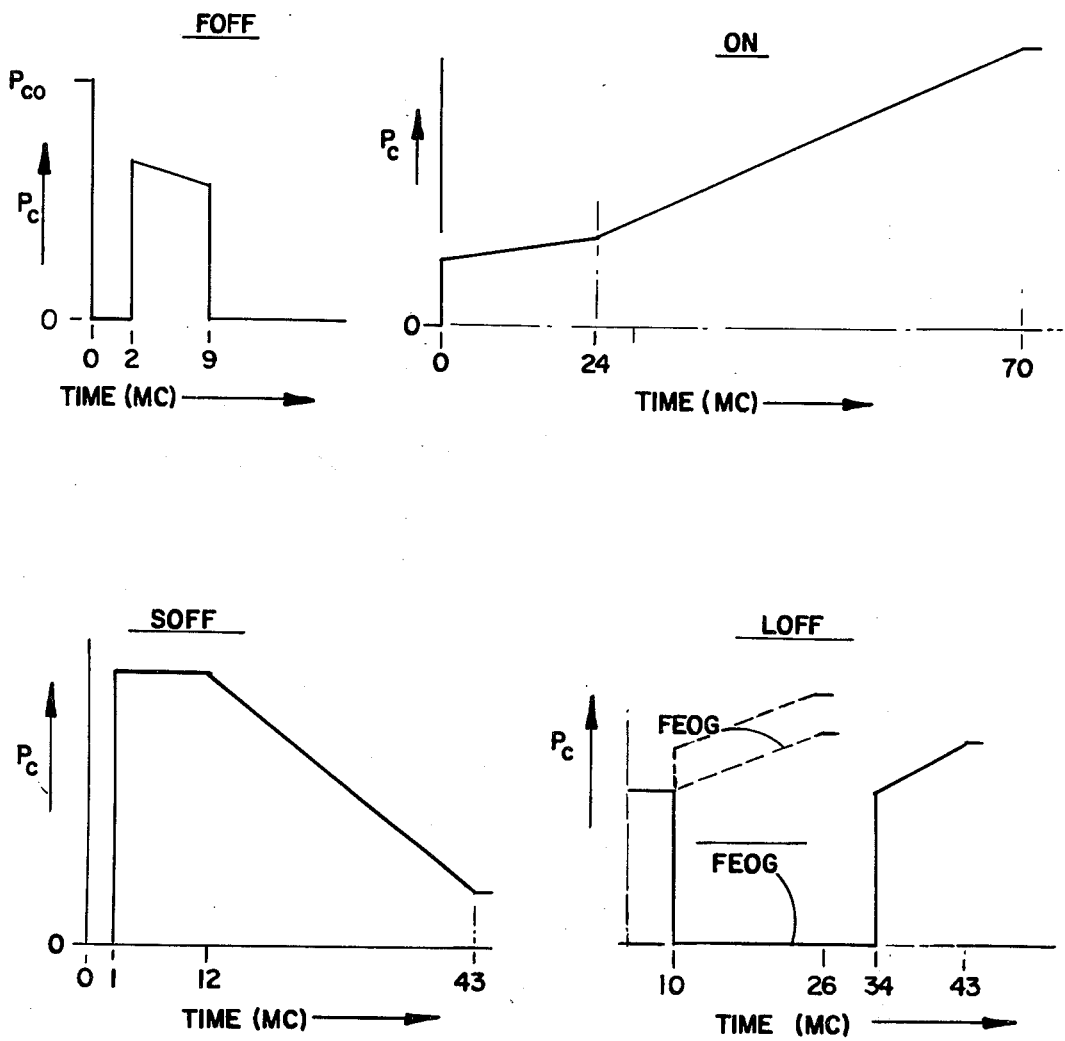
FIG. 8 is a family of representative system mode response envelopes versus time associated with the logic modes illustrated in FIG. 5.

Mode FOFF is a test signal injection mode which, in response to the application by the operator of excessive brake (foot treadle actuation) the excessive brake application results in a dive (rapidly decelerating wheel) condition, first blocks or interrupts the pressure application and then subsequently allows only a test pressure pulse (of selected shape and amplitude) to be inserted for a preselected pulsewidth, to test initial system braking performance and precondition the vehicle braking state. In FIG. 5, the FOFF mode (and the other modes there illustrated) sub-mode time intervals are indicated (in terms of mode counter clock intervals by the MC column, the pressure program being indicated by $P_c$, and the modification rates ($\Delta PR$) by which the pressure reference (PR) is progressively modified being indicated by increments per mode clocking interval. In FIG. 5, it is apparent that the values of $P_{(mod)}$ for the various modes are as follows: mode FOFF are $-P_R$, $-70$, and $-P_R$; LOFF are $-100$, $-P_R$, O, $-P_R$, O, SOFF are $-P_R$, $-54$, $-54$; ON are O and O. Representative resultant pressure program envelopes for such modes are shown in FIG. 8.

The ON and SOFF modes represent a set of two iterative control modes adapted to cause the vehicle generally to track the knee of the road force versus velocity envelope, as explained in connection with the description of curve 35 in FIG. 7, the ON mode being generally longer than the SOFF mode for programming a command pressure ($P_c$) of increasing magnitude (or calling for a continually reduced attenuation of the applied pressure) over a prolonged mode count (MC) corresponding to a mode subsequent to a dive recovery. The SOFF mode is a mode of normally lesser duration (not to exceed 43 mode clock counts in the exemplary illustration of FIG. 5) for applying a pressure program of initially delayed and subsequently decreasing pressure for inducing recovery from a dive (rapidly decelerating wheel) (see FIG. 8) condition. The resulting velocity performance of the iterative ON and SOFF modes, subsequent to the test or FOFF mode interposed at an initial (GO) dive or operator-actuated condition, is noted from the corresponding mode notations to curve 34 in FIG. 6.

The LOFF mode is an emergency control mode, which may be employed at the end of the game (e.g., as the vehicle approaches zero velocity) and as tracking the knee of the road force versus velocity envelope may become less accurate. As shown in the LOFF block of FIG. 5 and the corresponding time history in FIG. 8, such mode serves, after an initial interval of 10 mode clock counts, to either dump the pressure program ($P_c$=O) or to apply a pressure rate increase to $P_c$ for a limited time interval. If in the dump condition, such program pressure dump condition is continued for a third sub-mode interval, and finally the pressure $P_c$ is reapplied with an increasing pressure rate program.

Figure 5:
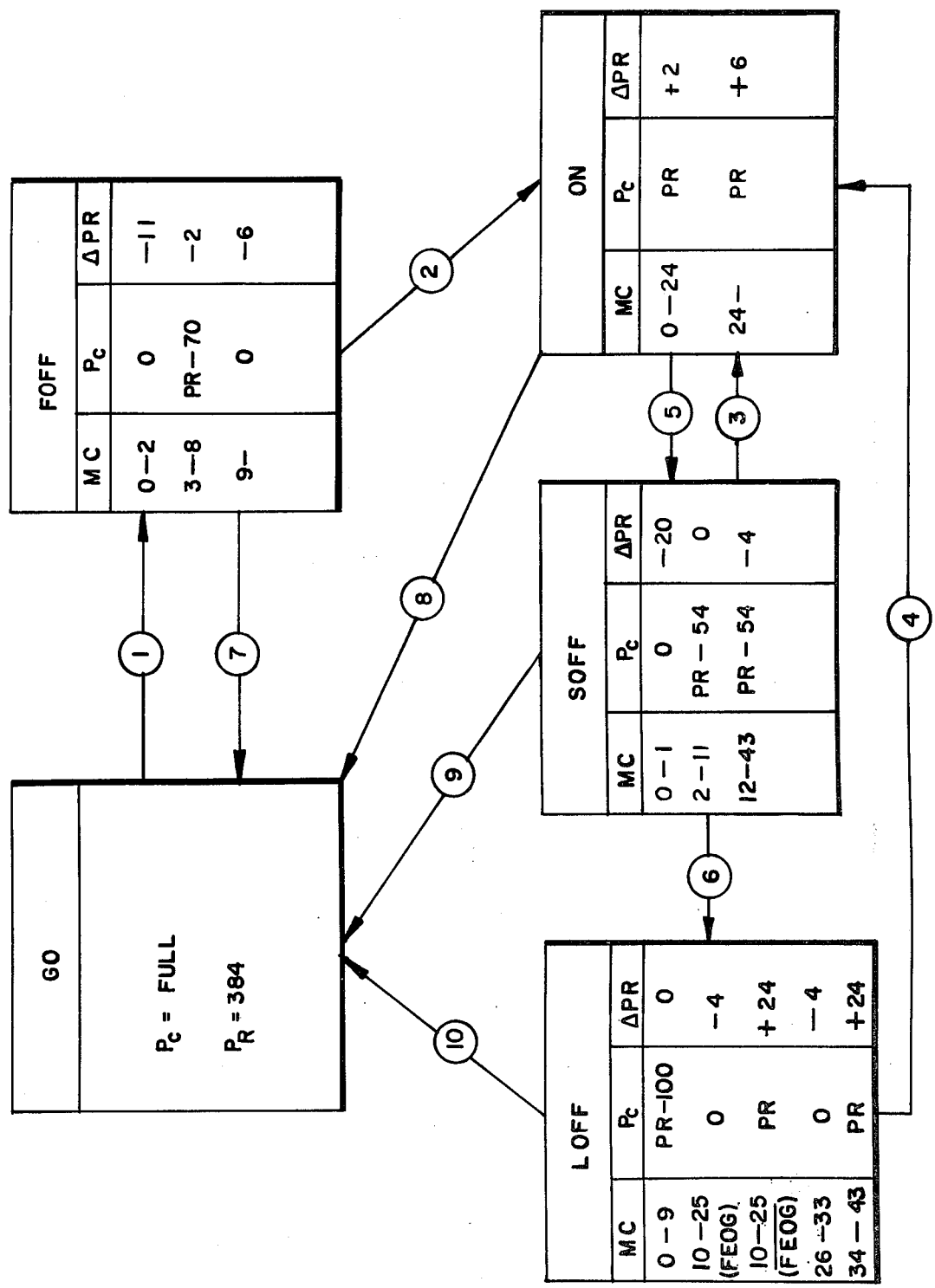
FIG. 5 is a logic diagram of the four logic modes employed in the mode register of FIG. 4.

The logic conditions for switching between GO, FOFF, ON, SOFF and LOFF modes illustrated by the correspondingly labelled blocks in FIG. 5 are described by transition equations identified by circled numerals (1–10) in FIG. 5 and are further described and defined as follows:

TRANSITION EQUATIONS

Set FOFF = GO($V_L$>5)($V_R$>5) [(AL<−4)-+(AR<−4)+($V_R$<35)(AR<−2)+($V_L$<35-)(Al<−2)] (1)
Set ON = FOFF [(MC≠0,1)(AL>−2-)(AR>−2)($V_L$>$V_T$)($V_R$>$V_T$)+MC=64] (2)
+ SOFF [(MC≠0)(AL>−2-)(AR>−2)($V_L$≥6)($V_R$≥6)] (3)
+ LOFF [($V_L$≥6)($V_R$≥6)(AL>−2)(AR>−2)] (4)
Set SOFF = ON [AL[($V_L$>15)+($V_L$<6)(DDL+λPR<383)] + AR[($V_R$>15)+($V_R$<6)(DDR+λPR<383)]] (5)
Set LOFF = SOFF [(MC≠0)($V_L$<6+V$_R$<6)] (6)
Set GO = FOFF [(MC=41)(VLR≤10)($V_L$<5)(-V$_R$<5)] (7)
+ ON [MC=70] (8)
+ SOFF [MC=44] (9)
+ LOFF [(MC=44)+(FEOG)(MC=25)] (10)

Where the following definitions apply:

DEFINITIONS

| | |
|---|---|
| AL | = Left Wheel Accl. (g's) |
| AR | = Right Wheel Accl. (g's) |
| $V_L$ | = Left Wheel Velocity (FT/SEC) |
| $V_R$ | = Right Wheel Velocity (FT/SEC) |

-continued

| | |
|---|---|
| AL | $= [(AL \leq -3.2)+(V_L<35)(AL<-2)]$ |
| AR | $= [(AR<-3.2)+(V_R<35)(AR<-2)]$ |
| MC | $=$ Number of mode counter clock intervals |
| Reset MC | $=$ Set FOFF+Set ON+Set SOFF+Set LOFF |
| Set FEOG | $=$ ON $[(VFLAG)[(MC=1)(V_L>8.5)(V_R>8.5)+(VON \leq 8.5)]]$ |
| Reset FEOG | $=$ Set ON+$V_L>15$+$V_R>15$ |
| Set VFLAG | $=$ SOFF($V_L \leq 6$+$V_R \leq 6$)+FOFF(VLR $\leq 10$) |
| Reset VFLAG | $=$ Set SOFF+LOFF(MC$>15$)+FOFF(VLR$>10$) |
| VON | $=$ Velocity of either wheel in the ON mode |
| DDL | $= \overline{AL}(V_L>6)$ ⎫ |
| | in the previous mode count clock interval |
| DDR | $= \overline{AR}(V_R>6)$ ⎭ |

Thus, for example, the ON mode is set (SET ON) in response to the conditions of any one of transition equations (2), (3) or (4) being met. Accordingly, where the system is in the FOFF mode (as indicated by the output on the FOFF bus of mode register 25 in FIG. 4, and such mode has been on in excess of one mode clock count (MC=0,1), and both (left and right) braked wheels (of a commonly control axle configuration) are decelerating at less than 2g's and at a velocity in excess of $V_T$, as described above, then mode selection logic 23 will reset mode counter 24 to zero (for commencing the ON-mode mode-count) and excite the ON mode of mode register 25. Register 25 and counter 24, in cooperation with logic 23, then preselectively excite reference signal source 26 and programming element 27 to provide a programmed pressure command output from element 28. Upon sensing a dive, or a specified mode clock count, the logic conditions compel a mode state change to a subsequent one of modes GO and SOFF, the conditions satisfying transition equation (5), for example, operating to switch to the companion mode SOFF of the two iterative modes ON and SOFF.

Figure 11:
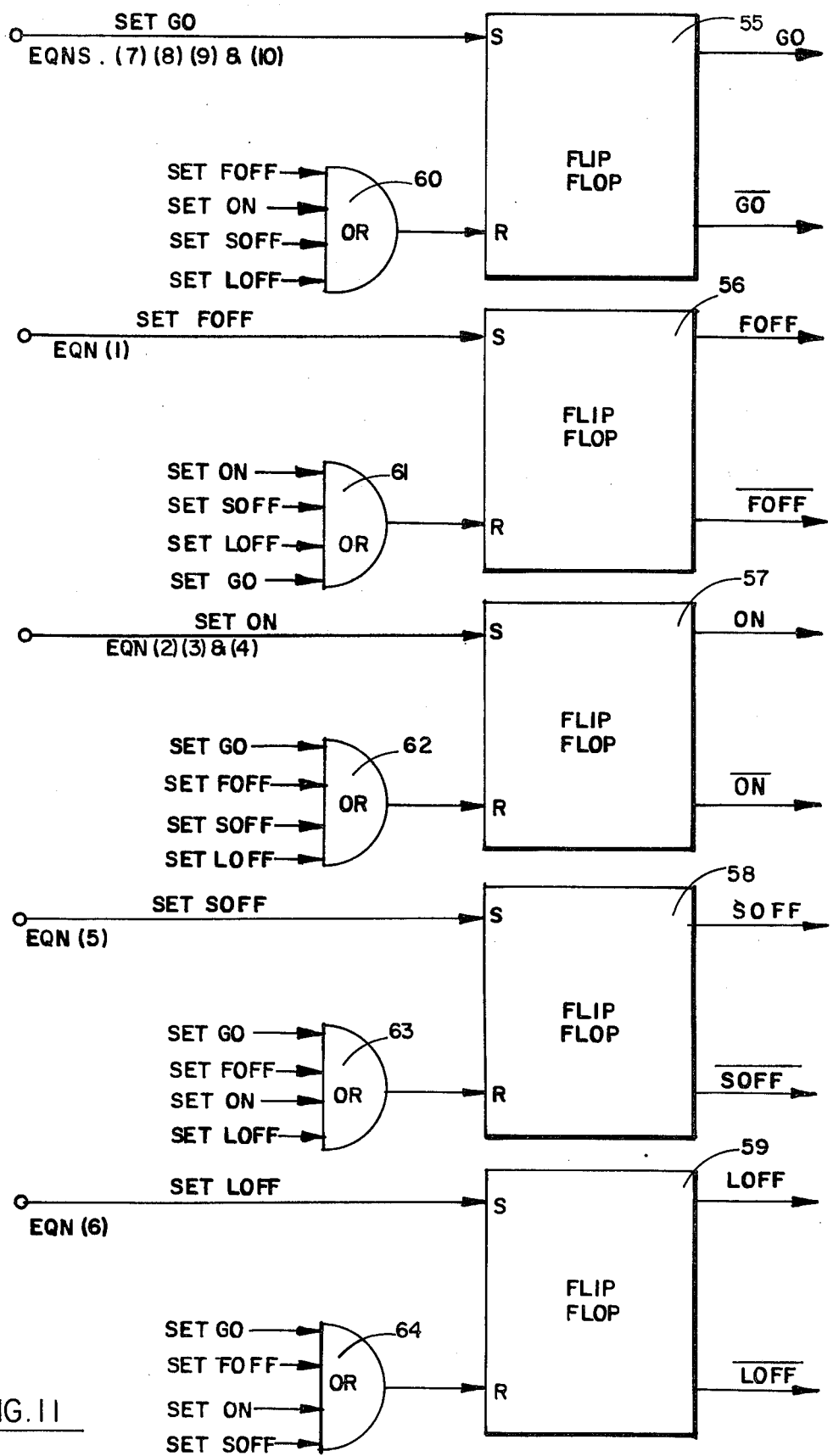
FIG. 11 is an exemplary embodiment of mode register 25 of FIG. 4.

The design of metal oxide semiconductor chips is well known to those skilled in the art as indicated by U.S. Pat. No. 3,644,907 to Gricci, et al., for "Complementary MOSFET Memory Cell" and U.S. Pat. No. 3,702,945 issued to Faith, et al., for "MOS Circuit with Nodal Capacitor Predischarging Means". Also, the mechanization of logic algorithms generally and by means of such chips is well understood. Also, the mechanization of logic functions for anti-skid brake control means is also known in the art, as indicated by FIG. 3 in the above-noted U.S. Pat. No. 3,790,227. Although, such details of implementing the functional elements and improved logic structure of the device of the subject invention need not be shown in detail but in block form only, for purposes of clarity exemplary mechanizations of elements 23 and 27 and element 25 of FIG. 4 are shown and some of the associated Equations (1)-(10) are shown in FIGS. 11, 12, 13, 14A and 14B. In FIG. 11, mode register 25 is shown as implemented by a series of flip flops 55, 56, 57, 58 and 59 and OR gates 60, 61, 62, 63 and 64 responsive to inputs from element 23 for generating the GO, FOFF, ON, SOFF, and LOFF outputs employed as inputs by elements 23 and 27. Register 25 may take other configurations similarly enabling it to store at least five distinct values (corresponding to the five control modes of interest) and allows the stored values to represented to be changed in response to signals generated by element 23.

Figure 12:
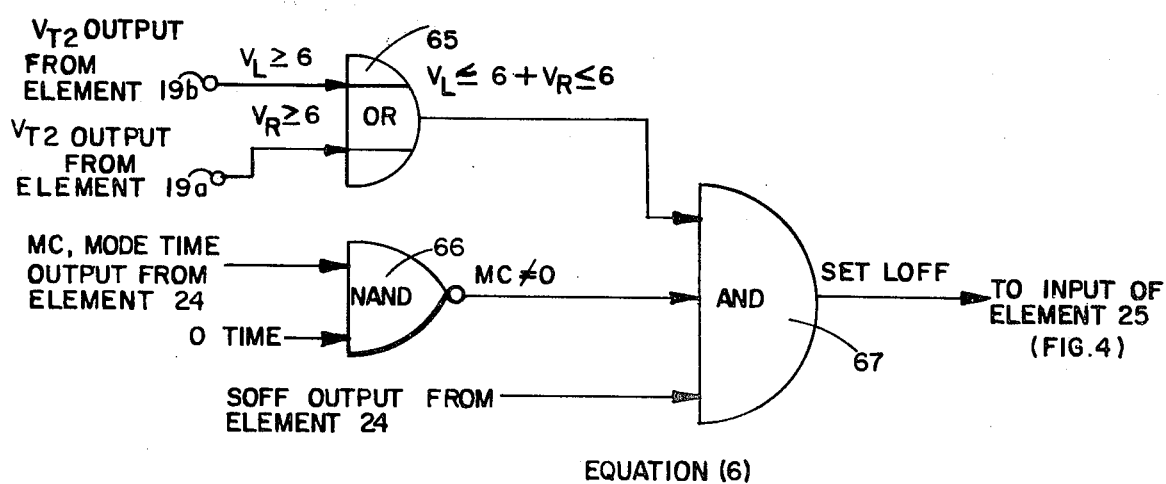
FIG. 12 is an exemplary embodiment of the logic state set input to element 59 of FIG. 11.

The set LOFF input to flip flop 59 (in FIG. 11), corresponding to Equation (6), may be easily embodied in any one of a number of mechanizations such as that exemplary one of FIG. 12, for example, whereby an AND gate 67 responsive to OR gate 65 and NAND gate 66 provides the desired set LOFF output; gate 65 being responsive to the $V_T$ outputs of elements 19a and 19b of FIG. 4 while gate 66 is responsive to element 24.

The set GO input to flip flop 55 (in FIG. 11), corresponding to Equations (7), (8), (9) and (10), may be also conveniently embodied in any one of a number of mechanizations such as that exemplary one of FIG. 13, for example, where an AND gate 68 is responsive to the outputs of AND gates 69, 70, 71 and 72, each corresponding to a respective one of Equations (7), (8), (9) and (10). Gate 69, in mechanizing Equation (7), is responsively coupled to the FOFF output of element 56 (in FIG. 11), the $V_T$ outputs of elements 19a and 19b (in FIG. 4), $V_T$ output from element 22, a preselected timing count,$_M C = 41$ from a coincidence gated timing count output from element 24 (in FIG. 4). Gate 70, in mechanizing Equation (8), is responsively coupled to the ON output of element 57 (in FIG. 11) and to a coincidence gating timing count output ($_M C = 70$) from element 24 (in FIG. 4). Gate 71, in mechanizing Equation (9), is responsively coupled to SOFF output of element 58 (in FIG. 11) and to a timing input corresponding to $_M C = 44$. Gate 72, in mechanizing Equation (10), is responsively coupled to the LOFF output of element 59 (in FIG. 11) and to an OR gate 73 which provides the logic gating term $[(_M C = 44) + (FEOG) (_M C = 25)]$. The first such gating term, $_M C = 44$, is obtained from the logic mechanization for gate 71 and the second gating input to OR gate 73 is obtained from an AND gate 74 responsively coupled to the on-state of output of the FEOG flip-flop of FIG. 4 and to a preselected timing coincidence term, $_M C = 25$.

In like manner, the mechanization of remaining logic equations corresponding to the set inputs to elements 56, 57 and 58 of FIG. 11 may be organized. The "Reset" (or R) inputs of each of elements 55, 56, 57, 58 and 59 of FIG. 11 correspond to the "Set State" inputs of the others of such elements. For example, the Reset (or R) inputs to OR gate 60 for flip flop 55 are the set state signals for each of flip flops 56, 57, 58 and 59. In other words, only one of such flip flops may be set at any time and such setting acts to reset all the others.

Figure 14A:
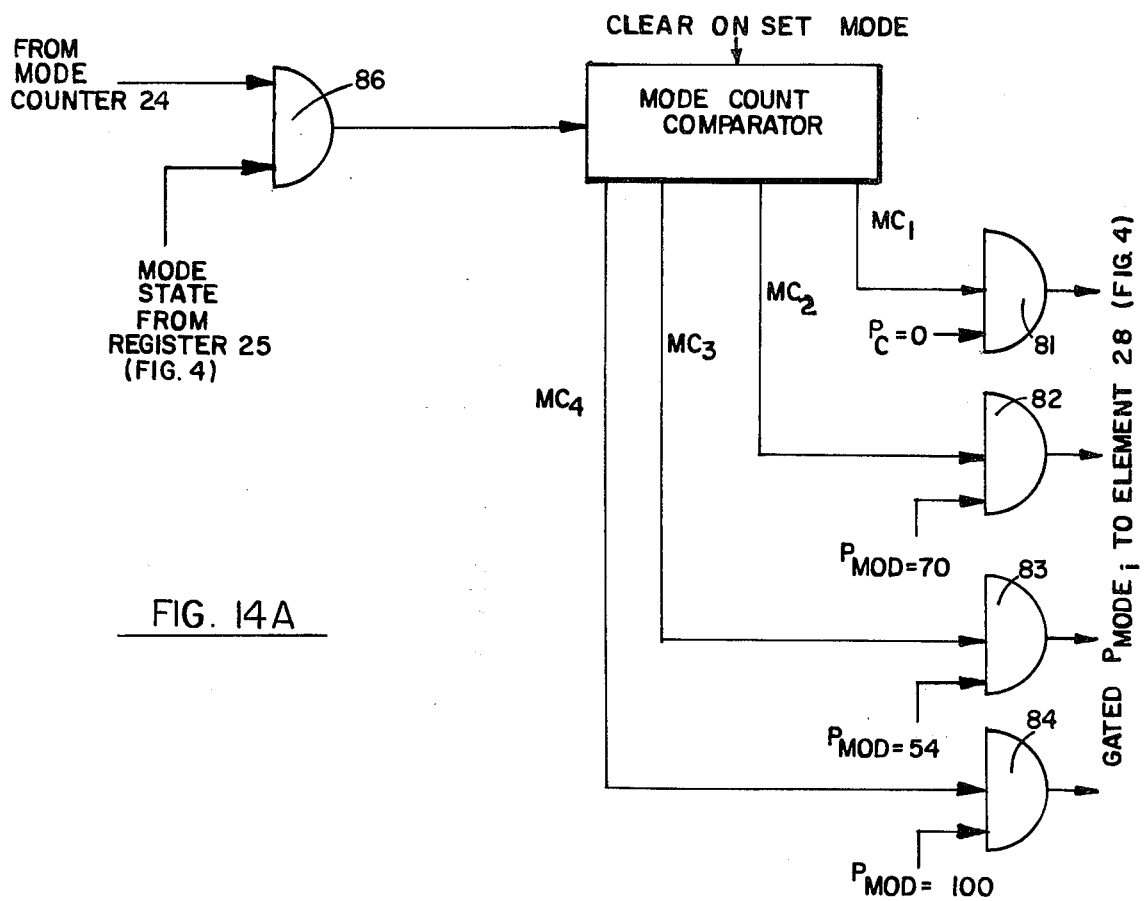
FIG. 14A is an exemplary mechanization of a portion of programmer 27 of FIG. 11.
Figure 14B:
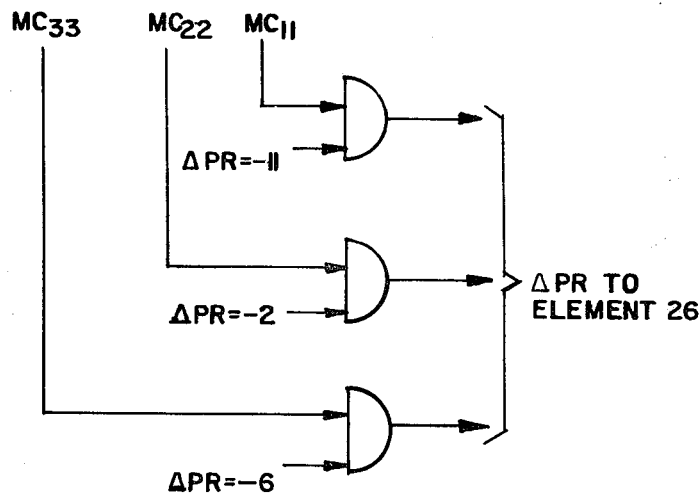
FIG. 14B is an exemplary mechanization of another portion of programmer 27.

An exemplary mechanization of pressure programmer 27 of FIG. 4, as the source of pressure signals $P_{MOD}$ and $\Delta PR$, is shown in FIGS. 14A and 14B. In FIG. 14A, preselected values of pressure signals at preselected values of pressure signals at preselected mode times $P_{MOD_i}(MC_i)$ are conveniently obtained for each of the mode states by mode time gating-on of each of such preselected pressure value signals at signal gates 81, 82, 83 and 84 at a mutually exclusive mode time MC; mode time signals $MC_1$, $MC_2$, $MC_3$ and $MC_4$ occurring on corresponding output lines of a mode count comparator 85 responsive to a gated output provided by a gate 86 input coupled to counter 24 and a preselected mode output of mode register 25 (in FIG. 4). A similar arrangement is employed for each of the five output modes of mode register 25 to achieve the responses illustrated in FIG. 8.

The ΔPR pressure signal inputs to element 26 in FIG. 4 are provided by the further similar mechanization of pressure programmer 27 (in FIG. 14B), shown in FIG. 14B for the FOFF mode only, as including mode time signals corresponding to those shown in the MC column of the FEOFF table in FIG. 5, for generating signals gating of those incremental pressure signal values shown in the ΔPR column of the FOFF table in FIG. 5. The remaining modes of ΔPR of course may be similarly mechanized in accordance with the ΔPR column of the remaining tables in FIG. 5.

Accordingly, there has been described an improved anti-skid brake control system which more carefully treats of the basic or generic aspects of the anti-skid control problem (and avoids overconcern with a myriad of secondary parameters of only limited interest), whereby improved control system performance is achieved over a wider range of vehicle performance and road conditions.

Although the invention has been described and illustrated in detail, it is to be clearly understood that the same is by way of illustration and example only and is not to be taken by way of limitation, the spirit and scope of this invention being limited only by the terms of the appended claims.

We claim;

1. A digital machine method for augmenting braking control of a braked wheeled vehicle employing fluid pressure operated wheel brakes, comprising the step of selectively modulating the fluid pressure applied to the valve of at least one braked wheel so as to cause the braking control to track the knee of the road torque and wheel velocity versus time envelope.

2. The method of claim 1 in which said step includes the set of iterative steps of
   preselectively relieving an applied brake pressure to said braked wheel in response to either wheel deceleration thereof being greater than a preselectively large first level or the combination of a wheel deceleration of a lesser preselected second level and a wheel velocity within a preselected first range of upper and lower velocity levels; and
   preselectively restoring an applied wheel brake pressure to said braked wheel for a period not in excess of a preselected first mode interval in response to said wheel deceleration being less than said second lesser deceleration level and said wheel velocity being at least equal to a second velocity level less than said first range of upper and lower velocity levels.

3. The method of claim 2 in which said first interval is substantially equal to ten times the response time of said valve.

4. The method of claim 2 in which there is further included the step of removing braking control augmentation in response to
   either the existence for a first preselected mode duration of the recited step of preselectively relieving
   or the existence for a second preselected mode duration of said recited step of preselectively restoring.

5. The method of claim 4 wherein there is included the alternative step intermediate said step of iterative steps and said step of removing braking control augmentation the further alternative step of adaptively reducing the pressure attenuation provided by said step for relieving only in response to wheel velocity decreasing below said velocity limit (6 fps).

6. The method of claim 2 in which there is included the further step intermediate said step of relieving and a next step subsequent thereto of the further step of adaptively reducing the pressure attenuation provided by said step for relieving only in response to wheel velocity decreasing below said velocity limit (6 fps).

7. A digital machine method for augmenting braking control of a braked wheel vehicle employing fluid pressure operated wheel brakes, comprising the step of selectively modulating the fluid pressure applied to the valve of at least one braked wheel so as to cause the braking control to track the knee of the road torque and wheel velocity versus time envelope, and including an additional and antecedent initial step of modulating the applied fluid pressure as a preselectively delayed and progressively increasing attenuated single test pressure pulse for a preselected pulse time interval, the delay corresponding to the delay time of said valve and said pulse interval corresponding to the rise time of said valve.

8. A digital machine method for augmenting braking control of a braked wheeled vehicle employing fluid pressure operated wheel brakes, comprising the step of selectively modulating the fluid pressure applied to the valve of at least one braked wheel so as to cause the braking control to track the knee of the road torque and wheel velocity versus time envelope, which said step includes the set of iterative steps of
   preselectively relieving an applied brake pressure to said braked wheel in response to either wheel deceleration thereof being greater than a preselectively large first level or the combination of a wheel deceleration of a lesser preselected second level and a wheel velocity within a preselected first range of upper and lower velocity levels; and
   preselectively restoring an applied wheel brake pressure to said braked wheel for a period not in excess of a preselected first mode interval in response to said wheel deceleration being less than said second lesser deceleration level and said wheel velocity being at least equal to a second velocity level less than said first range of upper and lower velocity levels,
and including an additional and antecedent initial step of
   modulating the applied fluid pressure as a preselectively delayed and progressively increasing attenuated single test pressure pulse for a preselected pulse time interval, the delay corresponding to the delay time of said valve and said pulse interval corresponding to the rise time of said valve.

9. A digital machine method for augmenting braking control of a braked wheeled vehicle employing fluid pressure operated wheel brakes, comprising the step of selectively modulating the fluid pressure applied to the valve of at least one braked wheel so as to cause the braking control to track the knee of the road torque and wheel velocity versus time envelope, and including an additional and antecedent initial step of attenuatively modulating the applied fluid pressure as a single initial test pressure pulse of a preselected pulse width.

10. The method of claim 9 in which said antecedent step and said iterative steps include the sequential limitation that said set of said iterative steps following said antecedent step commence with said step of preselectively restoring.

11. A digital machine method for augmenting braking control of a braked wheeled vehicle employing fluid pressure operated wheel brakes, comprising the step of selectively modulating the fluid pressure applied to the valve of at least one braked wheel so as to cause the braking control to track the knee of the road torque and wheel velocity versus time envelope, which said step includes the set of iterative steps of preselectively relieving an applied brake pressure to said braked wheel in response to either wheel deceleration thereof being greater than a preselectively large first level or the combination of a wheel deceleration of a lesser preselected second level and a wheel velocity within a preselected first range of upper and lower velocity levels; and preselectively restoring an applied wheel brake pressure to said braked wheel for a period not in excess of a preselected first mode interval in response to said wheel deceleration being less than said second lesser deceleration level and said wheel velocity being at least equal to a second velocity level less than said first range of upper and lower velocity levels, and including an additional and antecedent initial step of attenuatively modulating the applied fluid pressure as a single initial test pressure pulse of a preselected pulse width.

12. The method of claim 11 in which said antecedent step and said iterative steps include the sequential limitation that said set of said iterative steps following said antecedent step commence with said step of preselectively restoring.

* * * * *